C. Burleigh,
Wood Plane Attachment.
N° 14,272.  Patented Feb. 12, 1856.
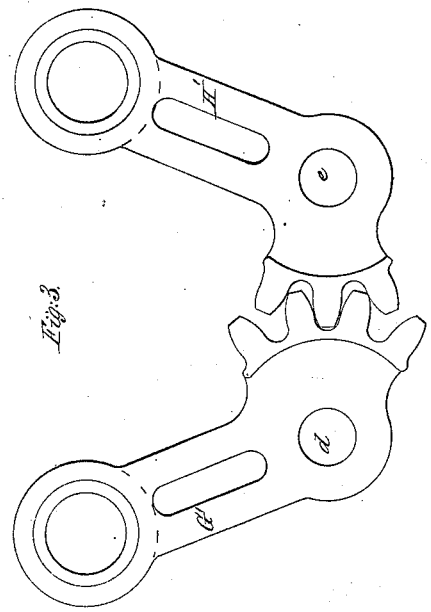
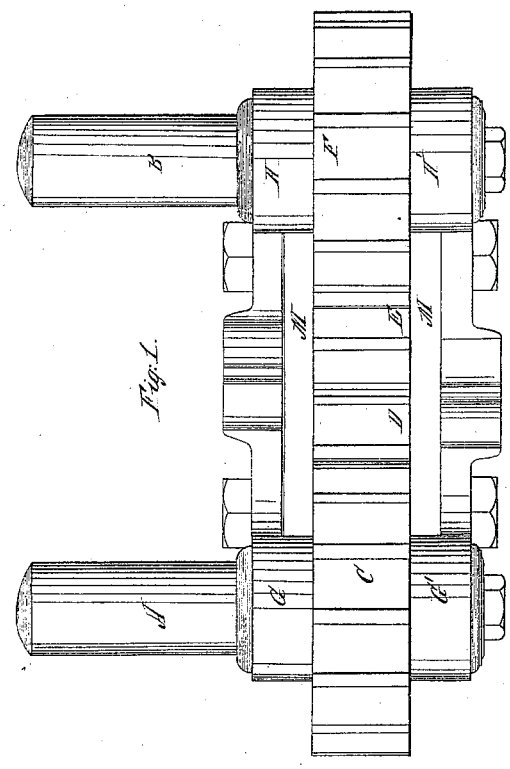
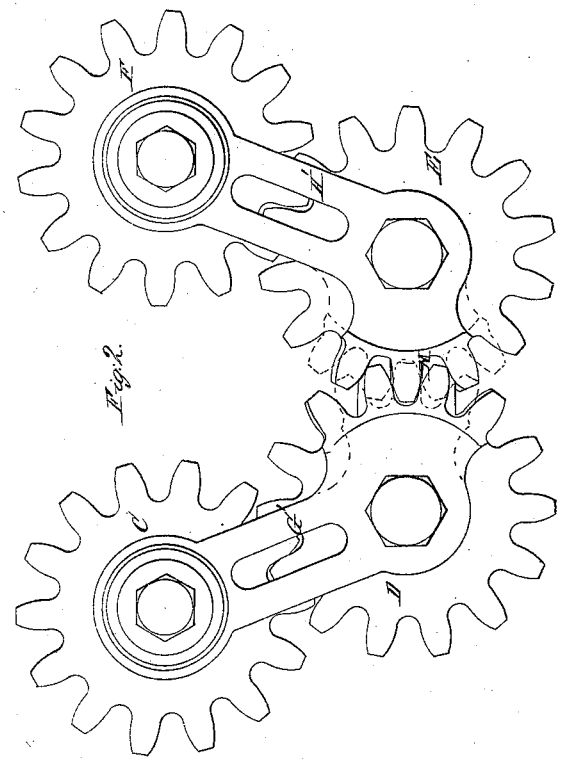

UNITED STATES PATENT OFFICE.

CHARLES BURLEIGH, OF FITCHBURG, MASSACHUSETTS, ASSIGNOR TO JNO. PUTNAM, SALMON W. PUTNAM, CHS. H. BROWN, BENJN. SNOW, JR., JNO. T. WRIGHT, CHS. BURLEIGH, SYLVESTER C. WRIGHT, AND DANVERS A. TENNEY.

GEARING FOR FEED-ROLLERS OF PLANING-MACHINES.

Specification of Letters Patent No. 14,272, dated February 12, 1856.

*To all whom it may concern:*

Be it known that I, CHAS. BURLEIGH, of Fitchburg, in the county of Worcester and State of Massachusetts, have invented a new and useful Improvement in Gearing for Connecting Feed and Pressure Rolls, of which the following is a full, clear, and exact description, reference being had to the accompanying drawings, making part of this specification, in which—

Figure 1 is a plan; Fig. 2, an elevation; Fig. 3, details which will be referred to hereafter.

Where feed or pressure rolls are connected together by means of intermediate gears for the purpose of allowing the rolls to be separated a greater or less distance from each other, it becomes necessary to support the auxiliary gears in some manner to prevent them from falling and engaging with the two gears upon the end of the feed rolls at the same time, by which either the cogs would be stripped or the machinery stopped. In Letters Patent granted Wm. E. Cornell and Charles W. Brown on the 17th of July, 1847, for a method of accomplishing this object the auxiliary gears were supported in their proper position by a diagonal arm or link. In certain positions of the rolls, however, this arm is thrown into a position almost parallel with the link connecting two lower gears of the train, whereby a great strain is thrown upon the parts which are thus subjected to unnecessary wear and breakage.

To remedy this evil is the object of my present invention, which I will now proceed to describe.

In the accompanying drawings, A, is the shaft of the lower roll; B, the shaft of the upper; the former carries a gear C, from which motion is communicated to the gear F, upon the shaft of the upper feed roll by means of the intermediate gears D, and E. To prevent the wheel E, from dropping into a position where it should engage with both the wheels C, and F, at the same time, I make use of the following device, G.

G', H, H', are links pivoted to the shafts A and B, and in which the auxiliary gears B and E have their bearings at d, e, Fig. 3. These links are geared together for a short distance as at L, Fig. 3, by which means the gears which they carry are prevented from dropping out of their proper position.

M, are the straight links which connect the auxiliary gears D, and E.

By means of the above described construction and arrangement, all oblique strain upon the parts is avoided as will be apparent from an inspection of Fig. 3. The device is more compact and occupies less room than that heretofore employed for the purpose; it is furthermore simple and of more economical construction.

What I claim as my invention and desire to secure by Letters Patent is—

The toothed links H, and G, constructed and operating in the manner substantially as herein set forth.

CHARLES BURLEIGH.

Witnesses:
MOSES FAIRBANKS,
CHAS. T. SABIN.